United States Patent
Wang et al.

(10) Patent No.: US 8,699,722 B2
(45) Date of Patent: Apr. 15, 2014

(54) LOW COST NOISE FLOOR REDUCTION

(75) Inventors: Weifeng Wang, Shanghai (CN); Caogang Yu, Shanghai (CN)

(73) Assignee: Beken Corporation, Shanghai (CN)

( * ) Notice: Subject to any disclaimer, the term of this patent is extended or adjusted under 35 U.S.C. 154(b) by 504 days.

(21) Appl. No.: 13/176,686

(22) Filed: Jul. 5, 2011

(65) Prior Publication Data

US 2011/0261975 A1 Oct. 27, 2011

Related U.S. Application Data

(62) Division of application No. 12/262,106, filed on Oct. 30, 2008, now Pat. No. 8,098,845.

(30) Foreign Application Priority Data

Jun. 6, 2008 (CN) .......................... 2008 1 0043451

(51) Int. Cl.
*H04B 15/00* (2006.01)

(52) U.S. Cl.
USPC .................. 381/94.1; 381/94.2; 381/94.7

(58) Field of Classification Search
USPC ....................... 381/94.1, 94.2, 94, 7
See application file for complete search history.

(56) References Cited

U.S. PATENT DOCUMENTS 5,063,574 A * 11/1991 Moose .......................... 375/244

* cited by examiner

*Primary Examiner* — Long Pham
(74) *Attorney, Agent, or Firm* — Aaron Wininger; Perkins Coie LLP

(57) ABSTRACT

A method and system to reduce the noise floor of a communications system is disclosed. The system may be incorporated into any device that provides binary samples from a datastream, such as a cordless telephone system. The system is configured to determine a number of bits of the binary samples that are affected by noise. The system is then able to remove the noise by setting those bits to a fixed value. The fixed value may depend on whether the sample is positive or negative. The value to set may be chosen so that the least significant bits of each sample come as close as possible to 0 for that particular numerical representation system. The system can be integrated with other known signal processing methods.

8 Claims, 6 Drawing Sheets

Signals below the noise floor cannot be measured.

Only signals above the noise floor can be measured.

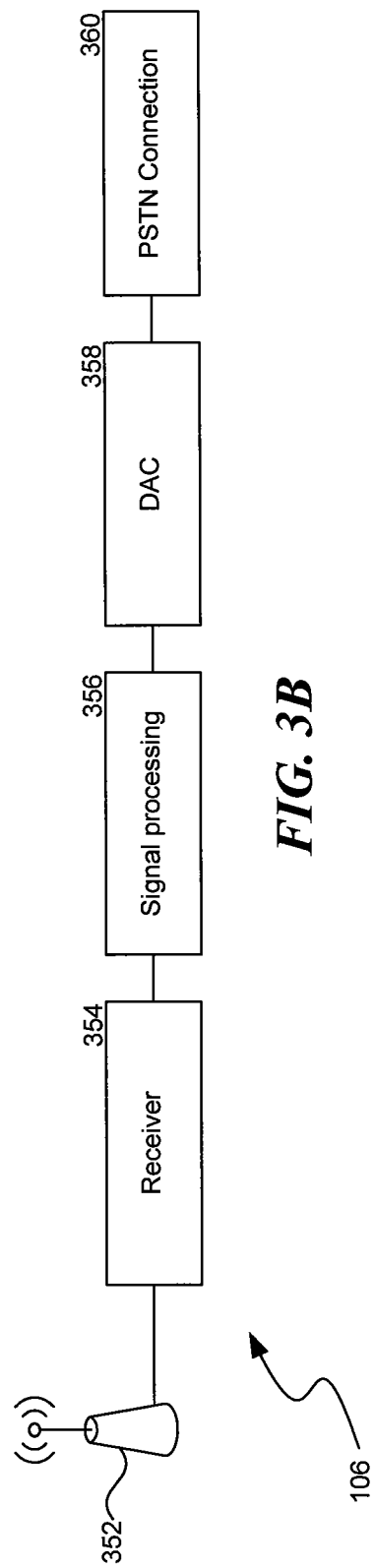

LOW COST NOISE FLOOR REDUCTION

CROSS-REFERENCE TO RELATED APPLICATIONS

This application is a divisional of U.S. patent application Ser. No. 12/262,106 filed Oct. 30, 2008, now U.S. Pat. No. 8,098,845 which claims priority to Chinese Patent Application No. 200810043451.8, filed Jun. 6, 2008, the disclosures of both of which are incorporated herein in its entirety.

TECHNICAL FIELD

The present disclosure is related to methods and apparatus for reducing the noise floor in a data transmission system.

BACKGROUND

Protecting a signal from corruption is a significant problem for data transmission systems. In particular, noise is a major factor in corrupting data signals. Digital systems can use error detection and correction techniques and other mechanisms to provide some protection. However, many of these mechanisms are expensive and complex to implement. Systems having analog components pose additional problems, because the analog components cannot take advantage of these mechanisms. Noise can result in unpredictable changes to the signal. For example, in a video system, noise can manifest as color aberration or variable object boundaries. In an audio system, noise manifests as static or clicking. The human brain is particularly sensitive to this type of variation in the signal. Therefore, it would be useful to have a low-cost means for reducing the effect of low level noise on the communications channel.

BRIEF DESCRIPTION OF THE DRAWINGS

FIG. 3B is a block diagram of a wireless telephone base station suitable for implementing a noise floor reduction system.

DETAILED DESCRIPTION

A method and system to reduce the noise floor of a communications system is disclosed (hereinafter referred to as the "noise floor reduction system" or the "system"). The system may be incorporated into any device that provides binary samples from a datastream. In some embodiments, the system is incorporated into a cordless phone system to reduce the noise floor in the audio communication. The system is configured to determine a number of bits of the binary samples that are affected by noise. The system is then able to remove the noise by setting those bits to a specified value. In some embodiments, the specified value depends on whether the sample is positive or negative. The value to set may be chosen so that the least significant bits of each sample come as close as possible to 0 for that particular numerical representation. For example, a system using a two's complement representation sets the least significant bits of a negative number to be equal to all ones, which is equivalent to −1. For a positive number, the system avoids introducing a DC bias by setting the least significant bit to one and the remaining low-order bits to zero, which is equivalent to +1.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
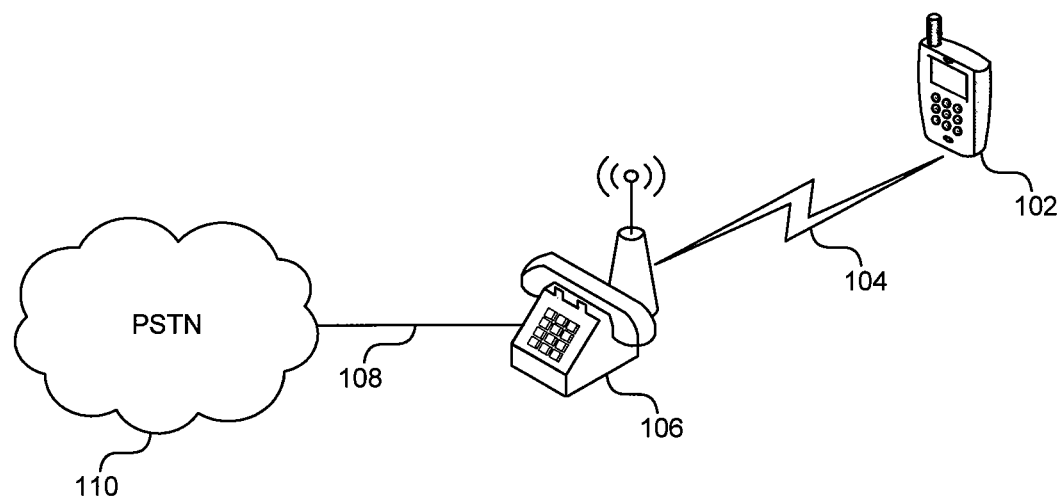
FIG. 1 is a diagram of a representative environment in which a noise floor reduction system operates.

FIG. 1 is a block diagram of an environment 100 in which a noise floor reduction system operates. The environment includes a cordless telephone handset 102, which is connected to a cordless telephone base station 106 through a wireless connection 104. Both the cordless telephone handset 102 and the cordless telephone base station 106 include digital components to receive and process the audio signal. The cordless telephone base station 106 connects through a wired connection 108 to a telephone network 110. In the embodiment shown in FIG. 1, the network is the public switched telephone network (PSTN), but the base station could also connect to a private branch exchange (PBX) or to a packet-switched network providing Voice over Internet Protocol (VoIP) services. Similarly, the wireless connection 104 and the wired connection 108 could be either wired or wireless connections. In general, any communications system could benefit from the noise floor reduction system.

In a communications system, the signal is the part of the electrical data carrier that includes the data being carried. Noise generally refers to a disturbance that interferes with the signal. Noise can come from numerous sources. One common noise source is thermal noise, which is produced by the random motion of charge carriers in a conductive medium whose temperature is above absolute zero. Other sources of electrical noise include flicker noise and white noise. In systems including analog-to-digital conversion, analog noise can also affect the signal. For example, in the cordless telephone system of FIG. 1, speaker hum and extraneous audio noise from the environment also contribute to noise. As these components accumulate, the aggregate noise can reach a point where it masks the signal at the receiver. Mathematically, this noise is treated as a separate component that is added to the initial signal in the transmission channel. That is, if the signal is denoted as X(t), the noise in the system may be denoted as N(t) and the received signal is Y(t)=X(t)+N(t), where t is time.

Figure 2A:
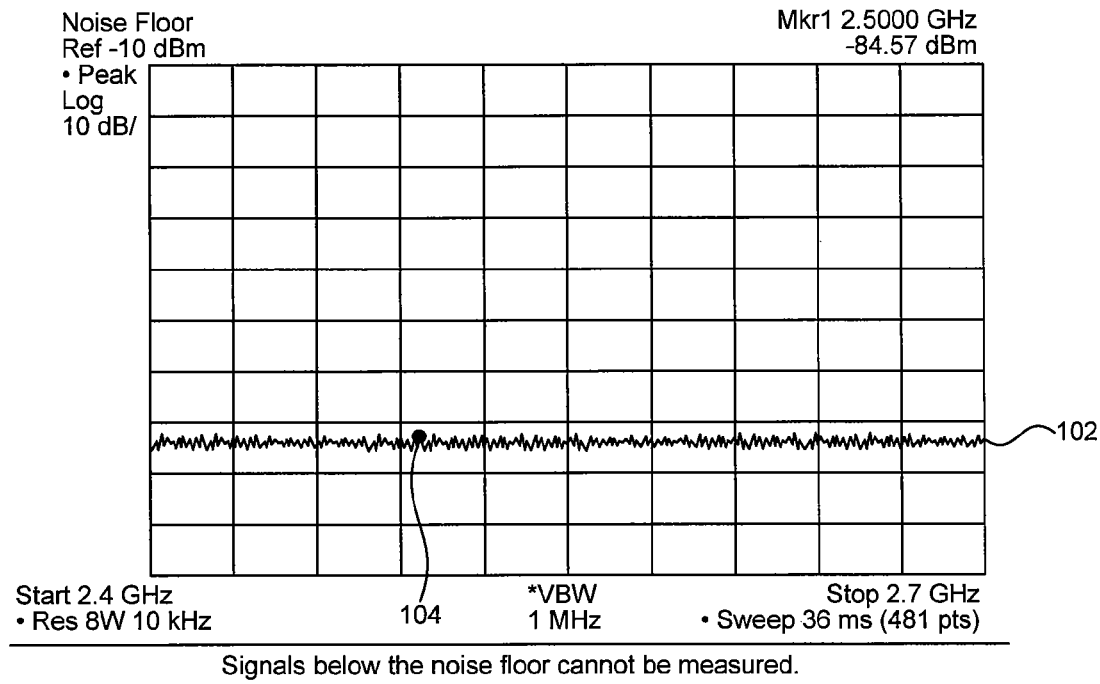
FIGS. 2A and 2B are signal graphs showing a signal in relation to the noise floor.

In signal theory, the noise floor is defined as the signal produced by summing all of the noise produced by these various sources. The noise floor defines the minimum signal amplitude that must be present for a receiver to detect the signal. For example, FIG. 2A is a signal graph showing a case in which the signal is so close to the noise floor that it cannot be detected. The noise floor 202 fluctuates about a mean level over the recording period. The signal point 204 is so low on this graph that it is indistinguishable from the surrounding noise. A receiver would have great difficulty in accurately detecting the signal.

Figure 2B:
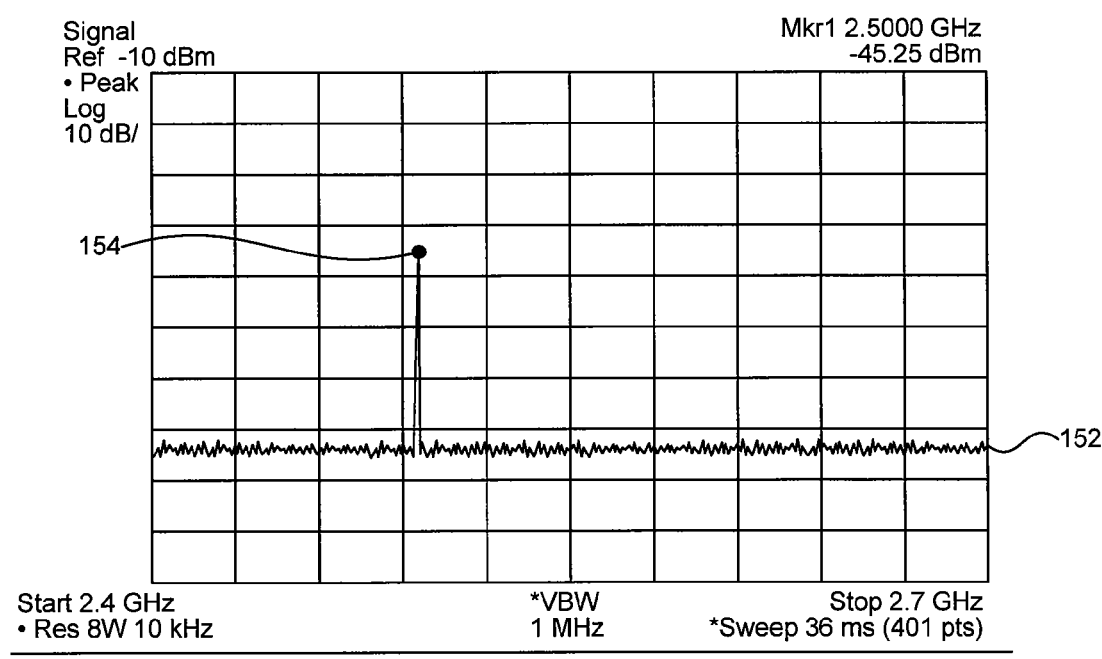

In contrast, FIG. 2B shows a similar signal graph in which the signal amplitude rises above the noise floor. Again, the noise floor 252 is not constant, but has a clear average level. However, in this case, the signal point 254 is sufficiently strong that it rises above the noise floor and can easily be detected by a receiver.

Mechanisms to reduce the noise floor are often either expensive or impractical. Some existing products solve the problem by using an extremely high performance analog-to-digital converter (ADC) and digital-to-analog converter (DAC) to give a low level noise floor. This can be effective because a major source of noise is the thermal noise of the ADC (or DAC) itself. By using a high performance ADC, the designer can significantly reduce the contribution of thermal noise in the ADC. However, this solution is impractical for low-cost devices because high-performance ADCs and DACs are also very expensive.

In voice systems such as the cordless phone system in FIG. 1, the system can lower the noise floor by selectively filtering unwanted audio noise. To do so, such systems use a voice activity detector (VAD) with a programmable threshold and an automatic gain control (AGC) with a programmable attack and decay time to mute output when the signal is below a certain level. In these configurations, the VAD processes the input signal and attempts to activate the microphone only in response to the user's voice speaking into the microphone. The AGC works in tandem by amplifying the signal appropriately when a desired signal is detected. However, to be effective, the VAD must have an infinite impulse response (IIR) filter with a high time constant, which can be slow to respond to changes in signal (e.g. when a person starts talking). In addition, the decision threshold is difficult to tune for all cases. For example, the ideal parameters for the VAD are different when the phone is used at a party compared to when it is used in a quiet room. The ideal parameters would vary similarly depending on the volume of the user's voice. A similar problem exists in implementing the AGC, because the programmable AGC can be hard to tune to work in all cases.

Figure 3A:
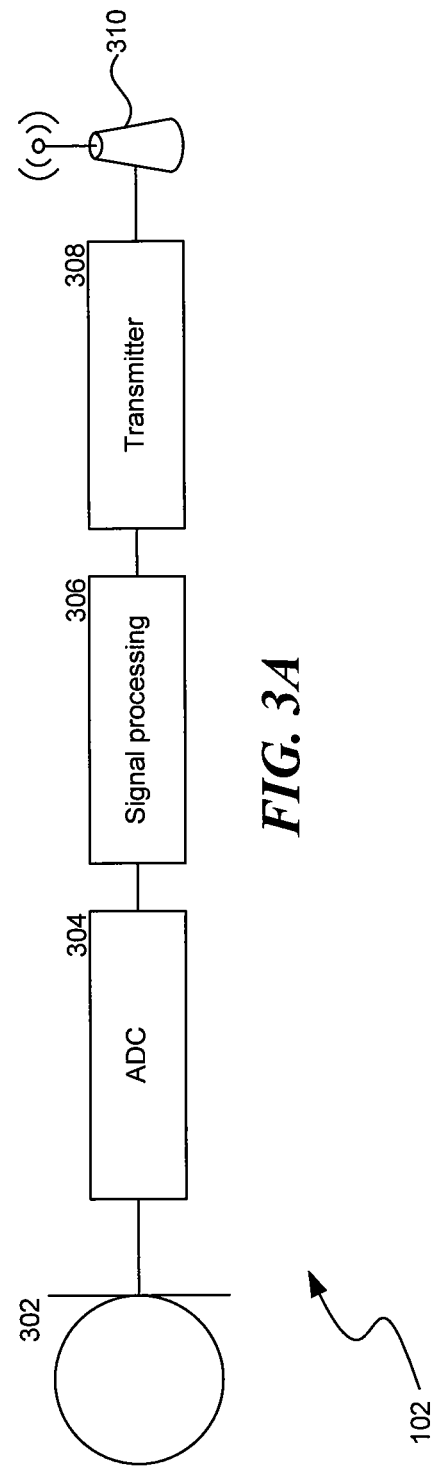
FIG. 3A is a block diagram of a wireless telephone handset suitable for implementing a noise floor reduction system.

FIG. 3A is a block diagram showing an embodiment of a wireless telephone handset 102 suitable for implementing a noise floor reduction system. The system includes a microphone 302 for receiving audio (e.g. voice) from a user. The microphone 302 converts sound waves from the environment, including the user's voice, into an analog electrical signal. Of course, this also incorporates environmental noise into the received signal. The microphone 302 sends the converted analog audio signal to the ADC 304. The ADC 304 converts the analog signal into a digital signal. The ADC 304 quantizes the incoming signal according to the number of levels allowed by the component. Implementations of ADCs are well-known in the art and will not be discussed further here.

The ADC 304 may produce digital output in a variety of known formats. For example, the ADC may produce binary numbers in a signed representation (i.e. having positive and negative values). In that case, the digital output can be in one of several well-known formats for representing negative numbers in binary.

Computer systems may use either one's complement or two's complement systems to represent signed binary numbers. In both systems, the most significant bit is used to represent the sign, with a one meaning that the number is negative. The negative of a number in one's complement is generated by inverting the bits of the number. The negative in two's complement is generated by adding one to the one's complement negative. Thus, the eight-bit one's complement of 00110110 is 11001001 and the two's complement is 11001010. The representation systems are designed such that the sum of a number and its negative is zero. Two's complement is the most commonly used representation in modern digital systems.

Computer systems may also use Excess-$2^{m-1}$ representation to represent signed binary numbers. In Excess-$2^{m-1}$ representation, all numbers (positive and negative) are shifted by adding $2^{m-1}$ to the number, where m is the number of bits being used. This is equivalent to setting zero equal to the midpoint of the full range of possible values for the number of bits being used (i.e. zero is represented by a one followed by all zeros, such as 10000000). In Excess-$2^{m-1}$ representation, negative numbers have zero in the most significant bit, while positive numbers have one in the most significant bit. Of course, one skilled in the art will recognize that for purposes of signal processing a number in an unsigned representation can be treated as an Excess-$2^{m-1}$ number with zero at the midpoint of the range of values for the unsigned representation. Thus, the noise floor reduction system can also be used with an unsigned representation as well as a signed representation.

After the ADC 304 has converted the analog signal to a digital representation, the signal is sent to the signal processing module 306. The signal processing module 306 executes various types of signal processing, such as filtering and AGC. The noise floor reduction system may be implemented at this stage in combination with these other signal processing techniques.

After signal processing is completed, the processed signal is sent to the transmitter 308. The transmitter channel codes and modulates the signal. This can be done according to any well-known method. For example, the transmitter might use a QPSK modulation, in which case the transmitter would also split the signal into its in-phase and quadrature components and modulate the components onto separate carriers. After the signal has been prepared for transmission by the transmitter 308, it is sent to the antenna 310, which wirelessly transmits the coded and modulated signal.

In an alternate embodiment, the designer may choose to place the signal processing in the base station 106, rather than in the wireless handset 102. For example, the system may be cheaper to build if the wireless handset 102 does not have to provide much signal processing, because the components are not as size-restricted in the base station.

FIG. 3B is a block diagram showing a wireless telephone base station 106 suitable for implementing a low cost noise floor reduction system. The base station 106 contains an antenna 352 which receives a signal from the handset. The antenna 352 sends the signal to a receiver 354, which demodulates the received signal. The demodulated signal is sent to signal processing module 356, which can be configured to provide similar functions to the signal processing module 306 found in the wireless handset 102. The signal processing module 356 sends the processed signal to the DAC 358, which converts the digital samples to an analog signal that can be sent through the PSTN connection 360. Thus, the noise floor reduction system can be located in either the handset 102 or the base station 106. The system can also be used with other applications where noise is a concern, such as in video transmission systems.

In the system shown in FIGS. 3A and 3B (and similar systems), the least significant bits provide little to no additional information. Even without the presence of noise, the least significant bits only provide a small amount of additional precision for the signal value. More importantly, in the typical system the noise floor is much less than the possible dynamic range of the signal (i.e. the total range of amplitudes the device can handle). Therefore, the most significant bits of the received signal (original signal plus noise) are the same as the most significant bits of the original signal. The least significant bits are affected by noise, rendering them effectively random.

Because noise affects only the least significant bits of the signal, the system can reduce the influence of noise by replacing these least significant bits with specified bit sequences. In effect, this eliminates the effect of noise on the signal at a cost of reducing the signal's precision. Subject to the limitations discussed below, the specified bit sequences may be any sequence of bits having the desired length.

However, the substitution should be implemented in a way that does not introduce any new error to the signal. One particular error that could result from this type of substitution is the introduction of a DC bias to the system. If the system does not balance the values, the substitution introduces a systematic shift in the center value for the system. This could introduce threshold errors and could also reduce the system's dynamic range. Therefore, the system generally uses complementary values depending on whether the received sample is positive or negative.

In one embodiment, the system sets the least significant bits to zero or to a value as close to zero as possible. The value chosen depends on the representation system being used for the values of samples. For example, in a two's complement system, the system cannot simply set the bits to zero, because that would shift the value closer to zero for positive numbers and away from zero for negative numbers. Instead, the system uses values as close to zero as possible without introducing a DC bias. In a two's complement representation, the system can set the least significant bits as close to zero as possible by setting the bits equal to one (because −1 is represented by all ones in two's complement representation). To balance the negative value, the system uses +1 for positive samples by setting the least significant bit to one and the remaining less significant bits to zero. The selection is similar for samples in a system using one's complement representation. One's complement representation has two distinct zero values— 00000000 and 11111111. Therefore, in a one's complement representation, the system sets the least significant bits to one for negative numbers and to zero for positive numbers.

The system is not limited to near-zero values. In another embodiment, the system uses an intermediate value equal to half the range of values for the least significant bits. For example, if the system is configured to substitute four bits, it might substitute ±3 (because 4 bits yields a range from +7 to −8). In that case, a system using two's complement representation would substitute 0011 for positive samples and 1101 for negative samples. In addition, the system could also adaptively vary the replacement bit sequences during operation. The system could include a feedback mechanism or other basis for changing the value to be substituted.

Figure 4:
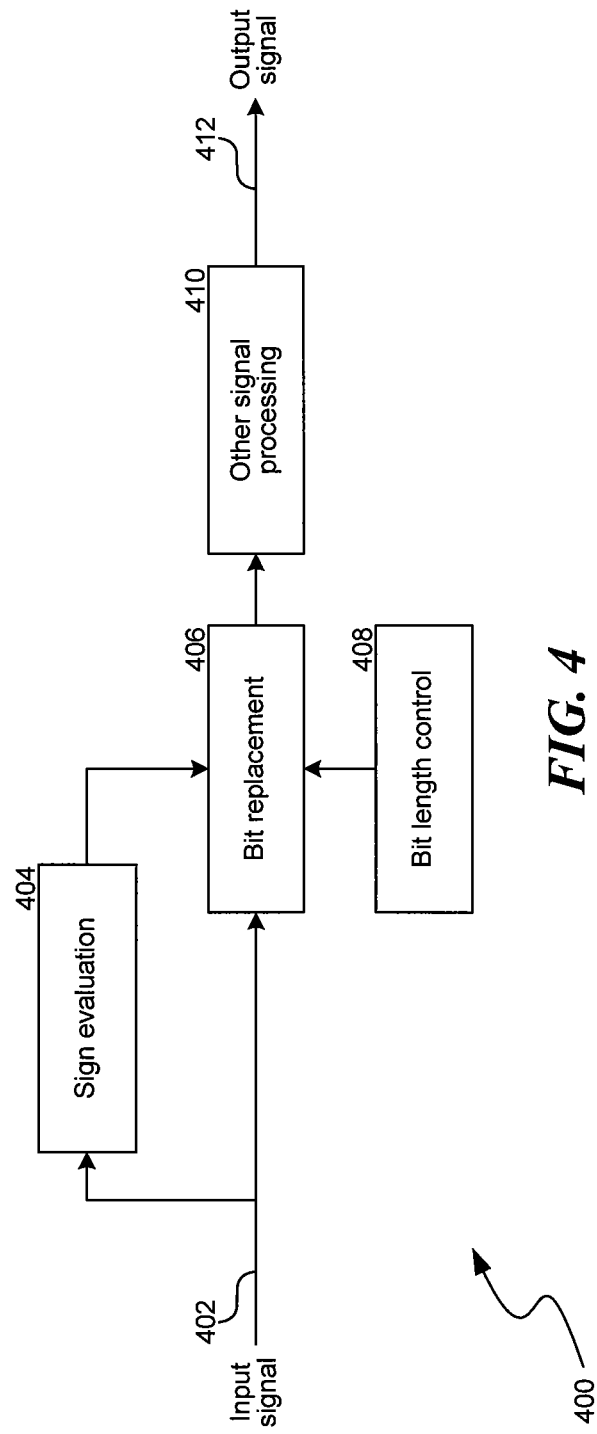
FIG. 4 is a block diagram of an implementation of a noise floor reduction system.

FIG. 4 is an exemplary block diagram showing an implementation 400 of the noise floor reduction system. The system receives input signal 402 in the form of samples of binary data. As discussed above, the input signal 402 is a digital signal and could come from any component capable of providing a digital signal. For example, the signal could be an output from the ADC 304 of FIG. 3A or the receiver 354 of FIG. 3B.

The system includes the Bit Length Control module 308, which determines how many bits of each sample should be set to the chosen substitution value. In effect, the Bit Length Control module 308 determines the precision of the samples of the signal. The Bit Length Control module 308 can make this choice in a number of ways. For example, the number of bits to substitute could be hard-coded at a certain value, such as 3 bits. A designer might use a combination of theoretical and experimental methods to determine which bits will be affected by noise. For example, a designer might test the system in a variety of environments to empirically determine the worst case. Alternatively, the Bit Length Control module 308 could dynamically vary the number of bits to set based on the current conditions. For example, the system might include a noise measurement module (not shown), which could measure the noise in the system over a period of time. In that case, the Bit Length Control module 308 could choose the number of bits that would be needed to largely eliminate the effect of the measured noise.

The system splits the input signal 402. The first branch is input to the Sign Evaluation module 404, which determines the sign of the sample. The Sign Evaluation module 404 outputs a signal to the Bit Replacement module 406 indicating whether the sample is positive or negative. In some embodiments, the Sign Evaluation module 404 determines the sign of the sample by evaluating the most significant bit of the input sample. In other embodiments, such as systems using Excess-$2^{m-1}$ representation, the Sign Evaluation module 404 determines the sign by using a comparator to determine if the value of the sample is greater than $2^{m-1}$.

The input signal 402 is also input to the Bit Replacement module 406, which replaces the least significant bits of the input signal 402 with the chosen bit sequence. The Bit Replacement module 406 uses the information from the Bit Length Control module 408 and the Sign Evaluation module 404 to generate a substitute bit sequence of the correct length. It then replaces the least significant bits of the input sample with the generated sequence and sends the updated sample to the Other Signal Processing module 410.

The Other Signal Processing module 410 executes other digital signal processing on the signal. The module receives the processed samples from the Bit Replacement module 406 and applies filters or other processing. The Other Signal Processing module 410 outputs the output signal 412, which is sent to various other components, such as a transmitter. Alternatively, the system could be implemented without the Other Signal Processing module 410, in which case the signal from the Bit Replacement module 406 is directly connected the output signal 412.

Figure 5:
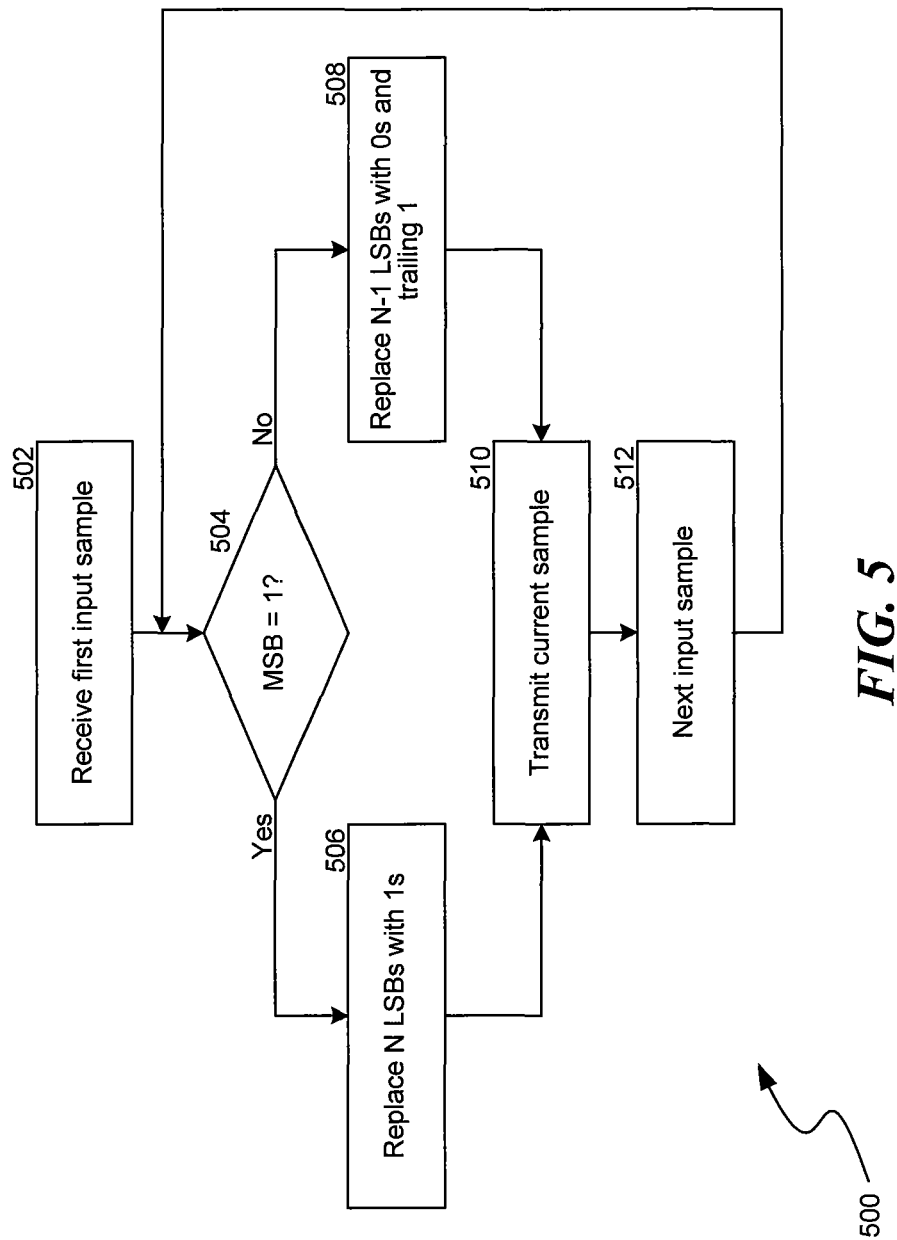
FIG. 5 is a flow chart of a process implemented by the noise floor reduction system for processing digital samples.

FIG. 5 is a flow chart of a process 500 implemented by the noise floor reduction system for processing the digital samples. Although the chart shows the process to handle two's complement symbols using near-zero values, one skilled in the art would understand that a similar process can apply to other configurations as well.

At block 502, the system receives a first input sample from input signal 402. After the sample is received, the system proceeds to decision block 504, where it determines whether the received sample is positive or negative. As discussed above, in most cases the system determines this by evaluating whether the most significant bit of the sample is zero or one.

If the sample is a negative number (i.e. most significant bit=1), the system proceeds to block 508, where the Bit Replacement module 406 replaces the N least significant bits with ones. Similarly, if the sample is a positive number (i.e. most significant bits=0), the system proceeds to block 508, where the Bit Replacement module 406 replaces the least significant bit with a 1 and the N−1 bits preceding that with 0s. Of course, as discussed above, the Bit Replacement module 406 can use any pair of bit sequences in the replacement bits, as long as the bit sequences are chosen such that they do not create a DC bias.

Regardless of whether the sample is positive or negative, after the bit substitution is executed, the system proceeds to block 510, where it sends the current sample on to Other Signal Processing 410. After transmitting the current sample, the system proceeds to block 512, where it receives the next input sample from the input signal 402.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. An apparatus for reducing noise in a digital system, comprising:
a sign evaluation component configured to determine the sign of an input binary sample;
a bit replacement component configured to replace the N least significant bits of the input binary sample with a first specified bit sequence if the determined sign is negative and replaces the N least significant bits of the input binary sample with a second specified bit sequence if the determined sign is positive, wherein the second specified bit sequence is chosen so that no DC bias is introduced.

2. The apparatus of claim 1, wherein the input binary sample is a sample of an audio signal.

3. The apparatus of claim 1, wherein the input binary sample is in an excess-$2^{m-1}$ representation.

4. The apparatus of claim 1, wherein the input binary sample is in a two's complement representation.

5. The apparatus of claim 4, wherein the first specified sequence is all ones and the second specified sequence has a one as the least significant bit and zeros otherwise.

6. The apparatus of claim 1, further comprising a bit length control component that controls the value of N.

7. The apparatus of claim 6, wherein the bit length control component modifies the value of N in response to environmental conditions.

8. The apparatus of claim 1, wherein the sign evaluation component determines the sign of the input binary sample by determining the value of the most significant bit of the input binary sample.

* * * * *